(12) United States Patent
Seo

(10) Patent No.: US 8,218,959 B2
(45) Date of Patent: *Jul. 10, 2012

(54) DUAL LENS OPTICAL SYSTEM AND DUAL LENS CAMERA HAVING THE SAME

(75) Inventor: Jung-pa Seo, Kimhae-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

This patent is subject to a terminal disclaimer.

(21) Appl. No.: 12/577,803

(22) Filed: Oct. 13, 2009

(65) Prior Publication Data

US 2010/0026878 A1    Feb. 4, 2010

Related U.S. Application Data

(63) Continuation of application No. 11/974,874, filed on Oct. 16, 2007, now Pat. No. 7,667,897.

(30) Foreign Application Priority Data

Oct. 17, 2006   (KR) .................. 10-2006-0101030

(51) Int. Cl.
*G03B 17/00* (2006.01)
(52) U.S. Cl. ................... 396/72; 396/351; 396/352
(58) Field of Classification Search .......... 396/72, 396/351, 352; 348/64, 343, 344; 359/672
See application file for complete search history.

(56) References Cited

U.S. PATENT DOCUMENTS

| | | | |
|---|---|---|---|
| 4,609,270 A * | 9/1986 | Kohno et al. | 396/74 |
| 4,953,029 A * | 8/1990 | Morimoto et al. | 348/64 |
| 5,940,126 A | 8/1999 | Kimura | |
| 6,532,035 B1 | 3/2003 | Saari et al. | |
| 6,924,948 B2 * | 8/2005 | Oshima et al. | 359/754 |
| 6,992,699 B1 | 1/2006 | Vance et al. | |
| 7,375,759 B2 * | 5/2008 | Lin | 348/371 |
| 7,548,267 B2 * | 6/2009 | Kosugiyama | 348/344 |
| 7,667,897 B2 * | 2/2010 | Seo | 359/672 |
| 7,764,320 B1 * | 7/2010 | Salvato | 348/344 |
| 7,889,435 B2 * | 2/2011 | Seo | 359/672 |
| 2001/0017661 A1 | 8/2001 | Shono | |
| 2008/0266443 A1 * | 10/2008 | Lee | 348/344 |
| 2011/0141339 A1 * | 6/2011 | Seo | 348/344 |

FOREIGN PATENT DOCUMENTS

| | | |
|---|---|---|
| JP | 02-262632 A | 10/1990 |
| JP | 10-254055 A | 9/1998 |
| JP | 2005-101729 A | 4/2005 |
| JP | 2006-064958 A | 3/2006 |
| JP | 2006-081089 A | 3/2006 |
| KR | 1993-0010597 A | 6/1993 |
| KR | 1995-0007036 B1 | 6/1995 |

OTHER PUBLICATIONS

Office Action established for CN200710180848.7, Jun. 29, 2010.
Office Action established for CN200710180848.7 (Aug. 3, 2011).

* cited by examiner

*Primary Examiner* — W. B. Perkey
(74) *Attorney, Agent, or Firm* — Drinker Biddle & Reath LLP

(57) ABSTRACT

A dual lens optical system includes a first optical system and a second optical system selectively redirecting at least one of two lights of representing images of object from two incident lenses into a first optical axis of light toward an image sensor by at least one reflection member, wherein, at least one optical element is disposed between an image sensor and the reflection member.

42 Claims, 9 Drawing Sheets

DUAL LENS OPTICAL SYSTEM AND DUAL LENS CAMERA HAVING THE SAME

CROSS-REFERENCE TO RELATED PATENT APPLICATIONS

This application is a continuation of U.S. patent application Ser. No. 11/974,874, filed on Oct. 16, 2007, which claims the benefit of Korean Patent Application No. 10-2006-0101030, filed on Oct. 17, 2006, in the Korean Intellectual Property Office, the disclosure of which is incorporated herein in its entirety by reference.

BACKGROUND

The present invention relates to a dual lens optical system and a dual lens camera having the same.

Recently, digital cameras have gradually become smaller and thinner. To this end, many cameras are adopting a refraction optical system. Also, many digital cameras are adopting a zoom optical system to improve convenience. However, as digital cameras become smaller and thinner, the inner space of the digital camera decreases so that there is a limit in adjusting the focal length using the zoom optical system. Accordingly, there is a limit in increasing the optical zoom ratio. A digital zoom is employed to compensate for the limit using software. However, since digital zoom uses a part of an image for magnification, image quality is deteriorates. Thus, the optical zoom ratio can be increased by simultaneously adopting the zoom optical system having a focal length in a standard range and a single focus optical system having a shorter focal length.

There are two conventional methods to adopt both of the different optical systems. The first method is to include a single image sensor and a plurality of optical systems and selectively use the appropriate optical system. The second method is to include a plurality of image sensors and a plurality of optical systems.

Japanese Patent Publication No. 10-254055 discloses an optical system using the first method. Referring to FIG. 1A, light passing through a first optical system 1 is reflected by a first reflection mirror 4 and incident on an image sensor 7. Referring to FIG. 1B, as the first reflection mirror 4 is moved to a vertical orientation, light passing through a second optical system 2 is reflected by a second reflection mirror 5 and incident on the image sensor 7. Referring to FIG. 1C, as the first and second reflection mirrors 4 and 5 are moved to the vertical orientation, light passing through a third optical system 3 is reflected by a third reflection mirror 6 and incident on the image sensor 7. Since all the optical systems 1, 2, and 3 to be adopted need to be included inside a compact camera, it is difficult to reduce the number of parts and make the camera compact.

Likewise, in an optical system using the second method, since the number of parts is further increased compared to the first method, it is difficult to reduce the costs for materials and make a camera compact.

SUMMARY

To solve the above and/or other problems, the present invention provides a dual lens optical system and a dual lens camera having the same.

According to an aspect of the present invention, there is provided a dual lens optical system comprising a first optical system reflecting an optical axis of light indicating an image of an object by 90° to form an image on an image sensor, and a second optical system having a movable reflection member configured to be selectively located on the part of a redirected axis of the optical axis of light passing through the first optical system, and refracting the light indicating the image of the object by 90° using the movable reflection member to be formed on the image sensor, wherein the first optical system and the second optical system share lenses and the image sensor located along an optical path after the movable reflection member.

The first and second optical systems share parts existing on the same optical path located after the movable reflection member. For example, the first and second optical systems share the second zoom lens group, the focusing lens group, and the image sensor. Thus, the number of parts is reduced compared to the conventional methods and there is less restriction in design space.

The first optical system comprises a first incident lens where light indicating the image of the object is incident, a first prism refracting the optical axis of the light by 90°, a first zoom lens group and a second zoom lens group adjusting a focal length to change a zoom ratio while moving along the optical axis, an image sensor where the light indicating the image of the object is formed, and a focusing lens group arranged to move along the optical axis between the second zoom lens group and the image sensor and adjusting focus so that the light indicating the image of the object is well formed on the image sensor.

The second optical system comprises a movable reflection member selectively positioned on the optical axis of light between the first zoom lens group and the second zoom lens group to allow light incident from an optical axis perpendicular to the part of the redirected optical axis of the first optical system to be formed on the image sensor, a second incident lens where the light indicating the image of the object is incident toward the movable reflection member in a direction perpendicular to the redirected optical axis of the first optical system, the second zoom lens group, and the image sensor.

The first optical system may be a zoom optical system and the second optical system may be a single-focus optical system having a focal length shorter than the focal length of the first optical system. Thus, the dual lens optical system according to an embodiment of the present invention integrally adopts the zoom optical system and the single-focus optical system. Thus, a wider range of an optical zoom ratio can be obtained compared to when the zoom optical system is only used.

The movable reflection member may be a prism or a reflection mirror. Also, the dual lens optical system may further comprise a lens cover selectively blocking the light on the second incident lens.

The lens cover blocks the second incident lens when the movable reflection member is not located on the optical axis between the first zoom lens group and the second zoom lens group and opens the second incident lens when the movable reflection member is located on the optical axis between the first zoom lens group and the second zoom lens group.

According to another aspect of the present invention, there is provided a dual lens camera comprising the dual lens optical system, a control unit receiving an electric signal from the image sensor and performing operation, and a memory unit electrically connected to the control unit and storing data indicating the image of the object.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE EMBODIMENTS

Figure 1A:
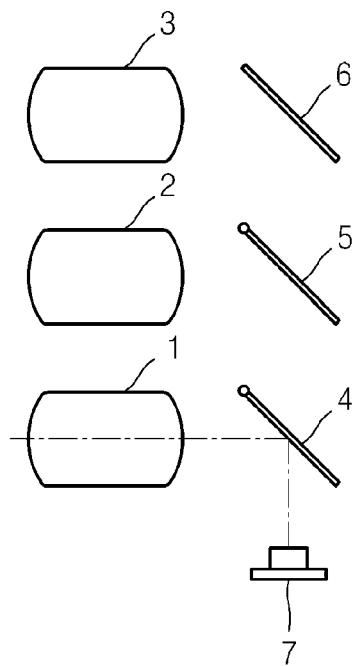
FIGS. 1A through 1C illustrate the operations of an optical system of a conventional multi-focus camera.
Figure 1B:
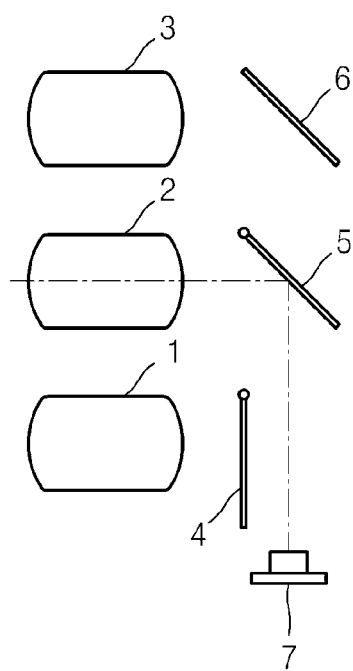
Figure 1C:
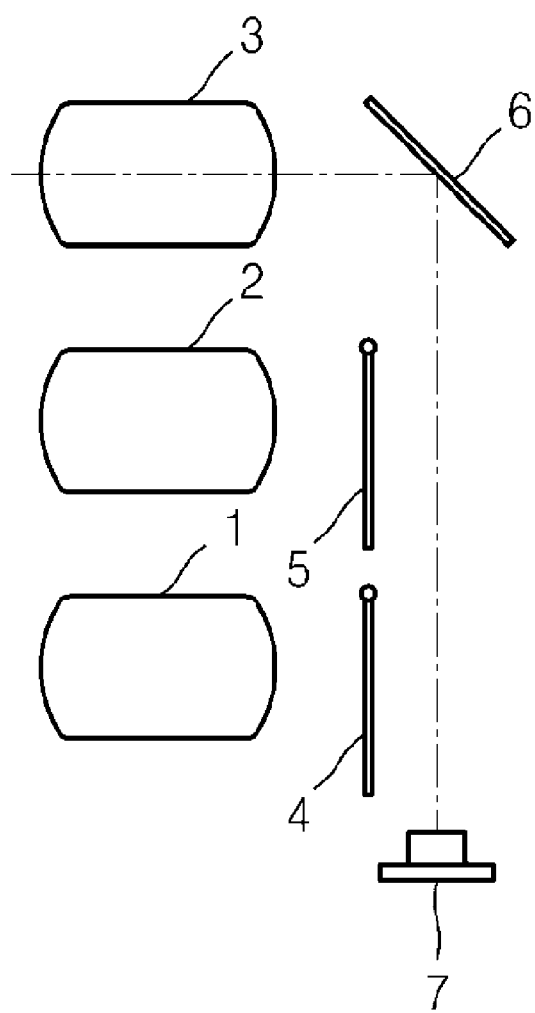

Hereinafter, the present invention will be described in detail by explaining preferred embodiments of the invention with reference to the attached drawings. Like reference numerals in the drawings denote like elements.

Figure 2A:
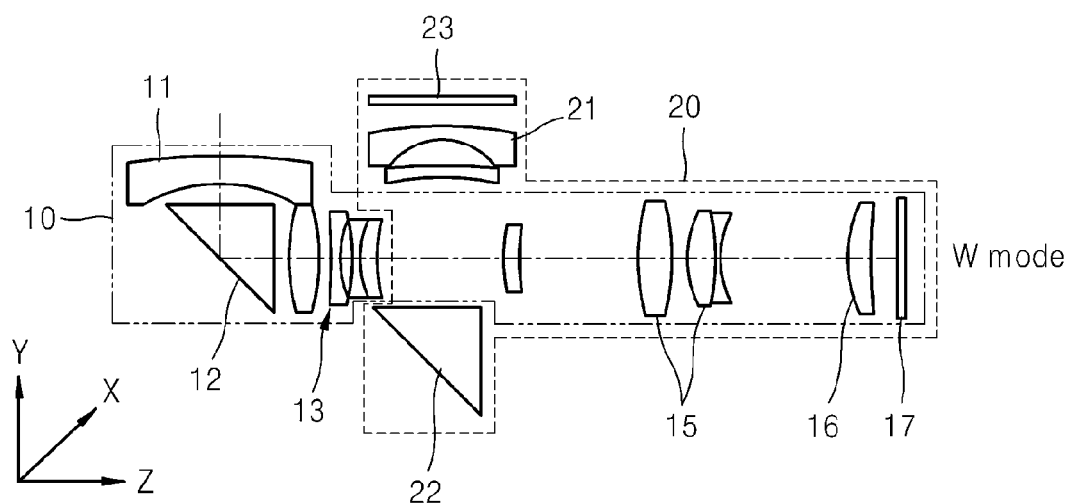
FIG. 2A illustrates a dual lens optical system in a W mode according to an embodiment of the present invention.
Figure 2B:
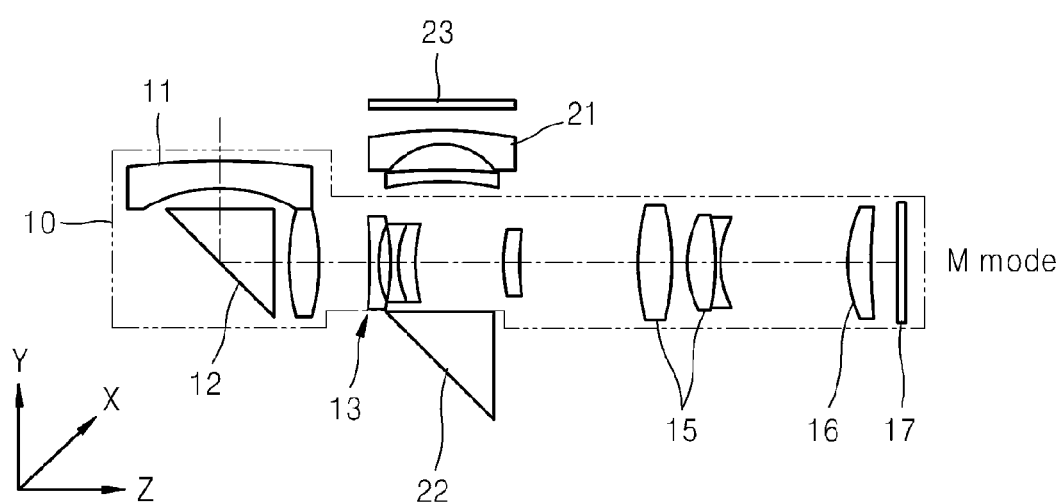
FIG. 2B illustrates a dual lens optical system in an M mode according to an embodiment of the present invention.
Figure 2C:
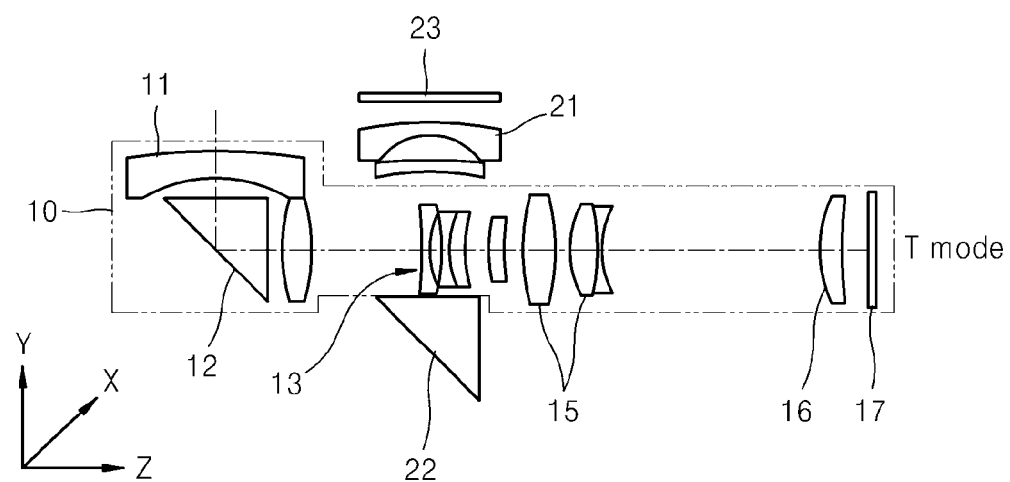
FIG. 2C illustrates a dual lens optical system in a T mode according to an embodiment of the present invention.

FIGS. 2A, 2B, and 2C respectively illustrate a dual lens optical system in a wide angle mode ("W mode"), a medium angle mode ("M mode"), and a telephoto mode ("T mode") according to an embodiment of the present invention. Referring to FIGS. 2A, 2B, and 2C, the dual lens optical system according to the present embodiment includes a first optical system 10 and a second optical system 20. In the current embodiment, the first optical system 10 is related to a zoom optical system while the second optical system 20 is related to a wide angle single-focus optical system.

The first optical system 10 includes a first incident lens 11, a first prism 12, a first zoom lens group 13, a second zoom lens group 15, a focusing lens group 16, and an image sensor 17. The first prism 12 redirects the optical axis of a path along which light proceeds, by 90°, the light representing an image of an object. The first zoom lens group 13 and the second zoom lens group 15 move along the optical axis to adjust a focus length and determine a zoom ratio. The focusing lens group 16 moves along the optical axis to adjust the focus so that the light representing the image of the object can be well formed on the image sensor 17. Although in the drawings the focusing lens group 16 is a single lens, it may also include two or more lenses. The image sensor 17 receives the light representing the image of the object and converts the light to an electric signal for each pixel thereof. The image sensor 17 can be a charge coupled device (CCD) or a complementary metal oxide semiconductor (CMOS), or any other suitable image sensing device.

The first optical system 10 is a zoom optical system that changes between W, M and T modes according to the movements of the first and second zoom lens groups 13 and 15. In detail, the focal length is the distance between the lens and the film (or image sensor) when the focus is on an image located at an infinite distance. In terms of a 35 mm camera, a standard focal length is between 40-100 mm. In the W mode, the focal length is relatively short, for example, 39 mm, so that a viewing angle is wide and a range of vision is large. Since the focal length is shorter than the standard, the W mode is a wide angle mode. Conversely, in the T mode, the focal length is relatively long, for example, 144.3 mm, so that the viewing angle is narrow and the range of vision is small. Since the focal length is longer than the standard, the T mode is telephoto mode. In the T mode, the optical zoom ratio is 3× because the focal length is three times longer than the focal length in the W mode.

In the above zoom optical system, the optical zoom ratio is determined by the movements of the first and second zoom lens groups 13 and 15 in a Z-axis direction. As digital cameras become smaller and thinner, there is a limit in increasing the optical zoom ratio. Thus, the dual lens optical system according to the present embodiment additionally adopts the second optical system 20.

Figure 2D:
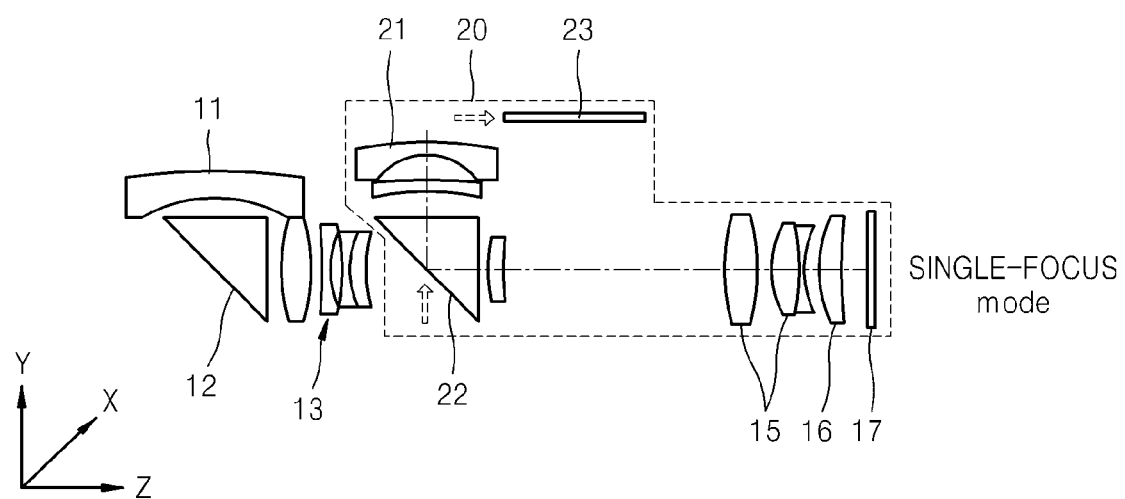
FIG. 2D illustrates a dual lens optical system in a SINGLE-FOCUS mode according to an embodiment of the present invention.
Figure 3A:
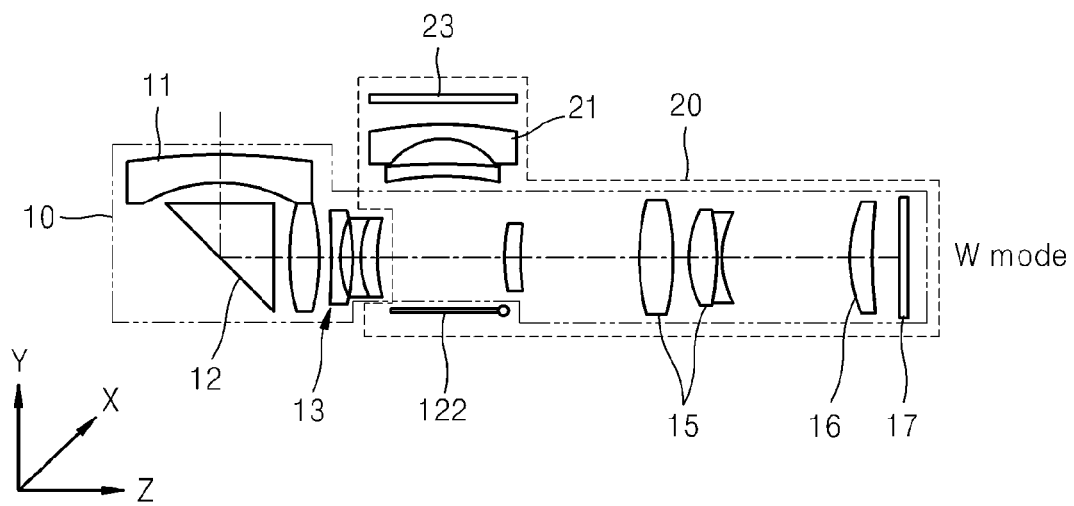
FIG. 3A illustrates a dual lens optical system in a W mode according to another embodiment of the present invention.
Figure 3B:
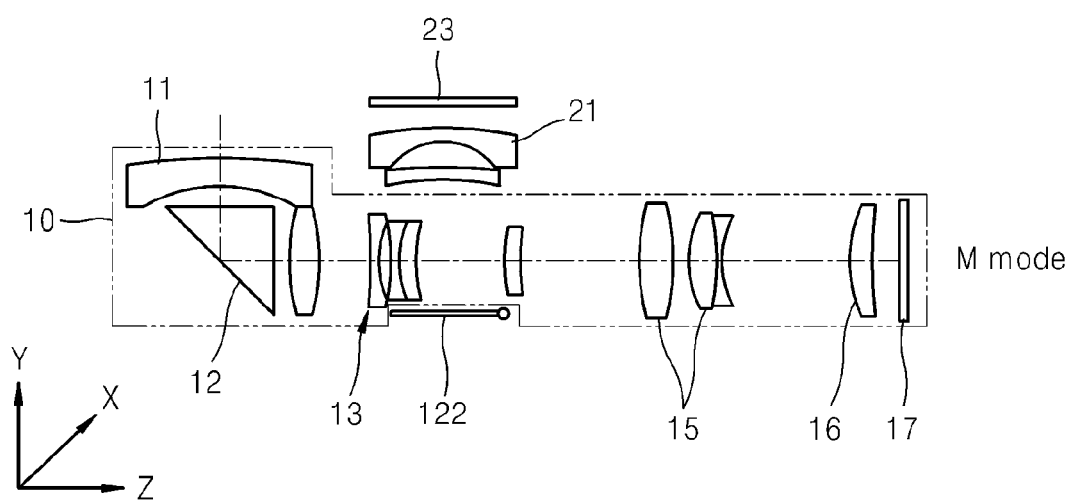
FIG. 3B illustrates a dual lens optical system in an M mode according to another embodiment of the present invention.
Figure 3C:
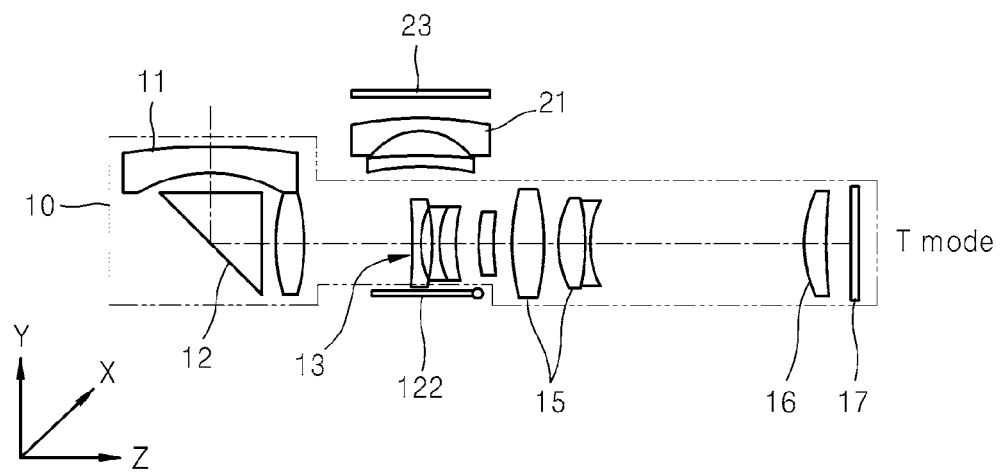
FIG. 3C illustrates a dual lens optical system in a T mode according to another embodiment of the present invention.
Figure 3D:
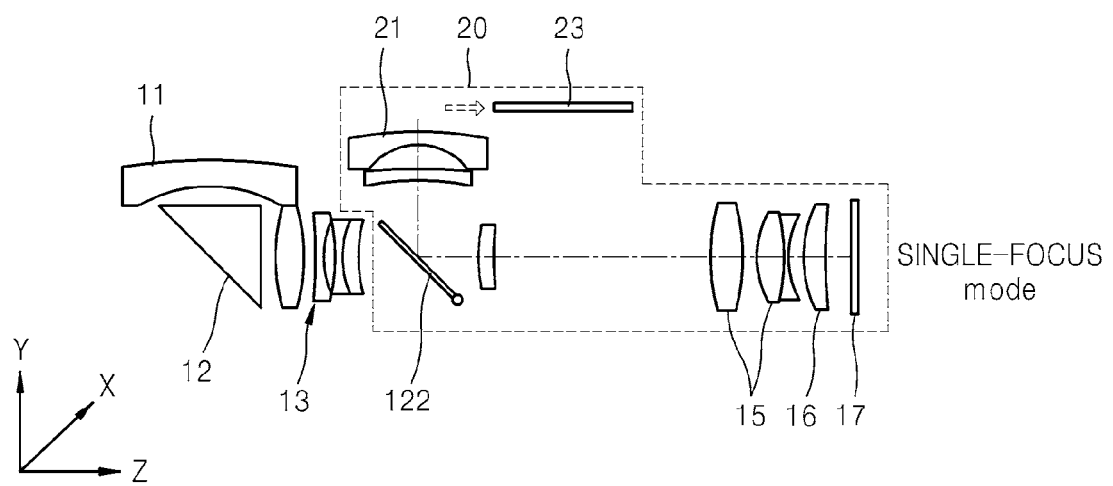
FIG. 3D illustrates a dual lens optical system in a wide angle mode according to another embodiment of the present invention.
Figure 4A:
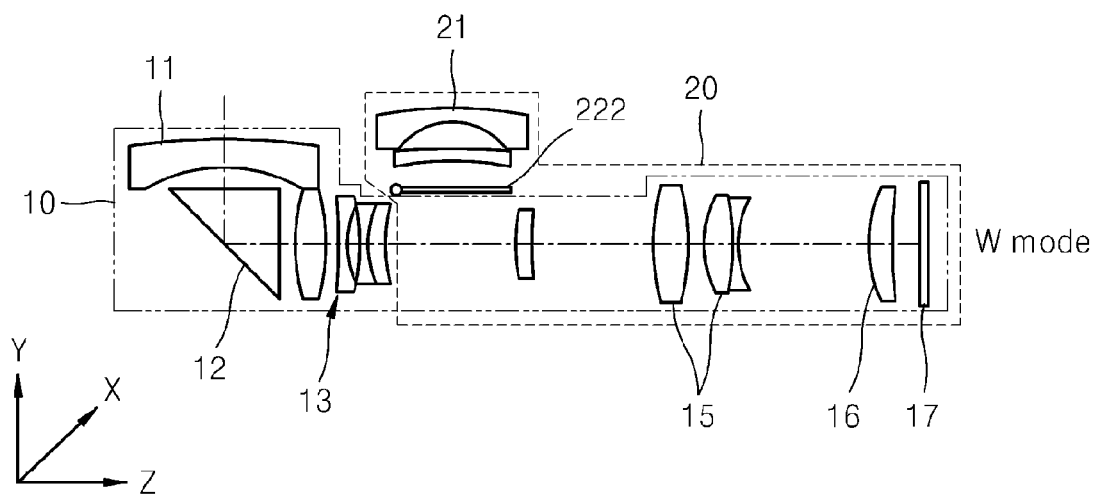
FIG. 4A illustrates a dual lens optical system in a W mode according to yet another embodiment of the present invention.
Figure 4B:
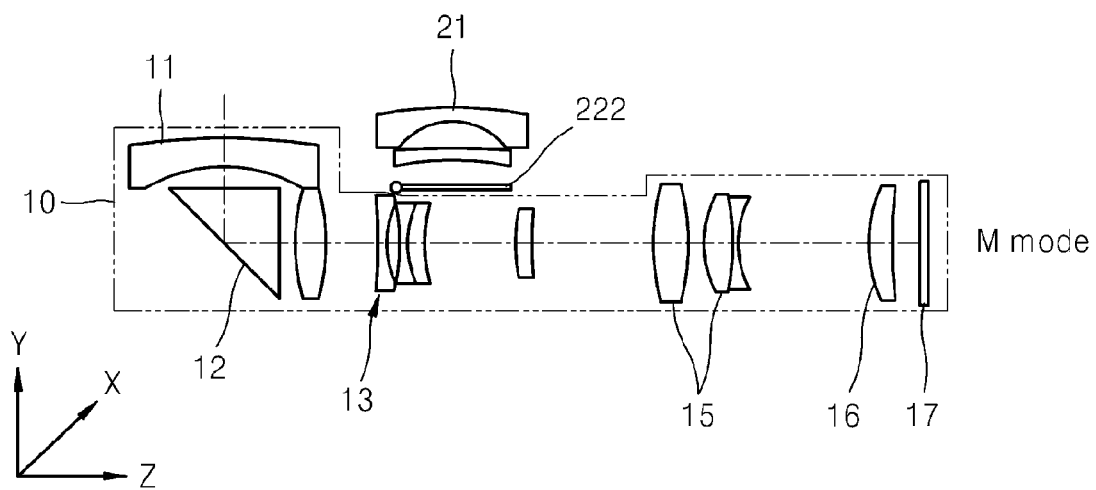
FIG. 4B illustrates a dual lens optical system in an M mode according to yet another embodiment of the present invention.
Figure 4C:
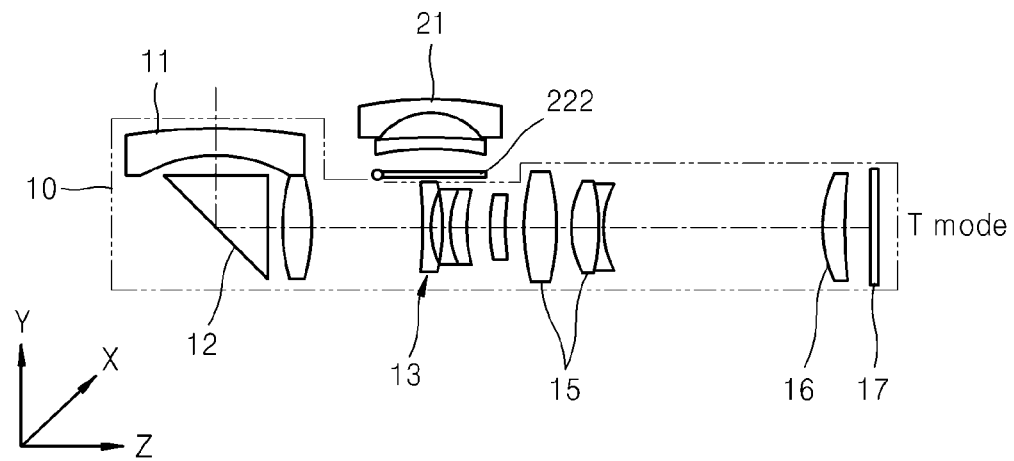
FIG. 4C illustrates a dual lens optical system in a T mode according to yet another embodiment of the present invention.
Figure 4D:
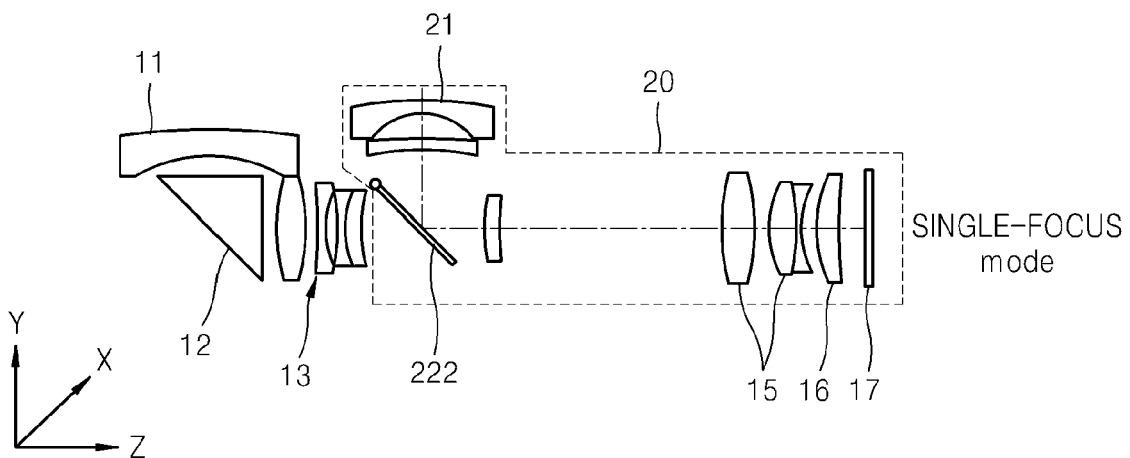
FIG. 4D illustrates a dual lens optical system in a wide angle mode according to yet another embodiment of the present invention.

FIG. 2D illustrates a dual lens optical system in a SINGLE-FOCUS mode according to an embodiment of the present invention. Referring to FIG. 2D, the second optical system 20 is a wide angle single-focus optical system. The second optical system 20 includes a lens cover 23, a second incident lens 21, a second prism 22, a first zoom lens group 13, a second zoom lens group 15, a focusing lens group 16, and a image sensor 17. The lens cover 23 may manually or automatically block light incident on the second incident lens 21. Although in the drawing the lens cover 23 is a single plate and moves to another position, a method of closing or opening the second incident lens 21 by the lens cover 23 can be easily modified by those skilled in the art. That is, the lens cover 23 is made of a plurality of pieces like a camera shutter and, as the pieces rotate around a predetermined axis, the second incident lens 21 can be closed or open.

Figure 5:
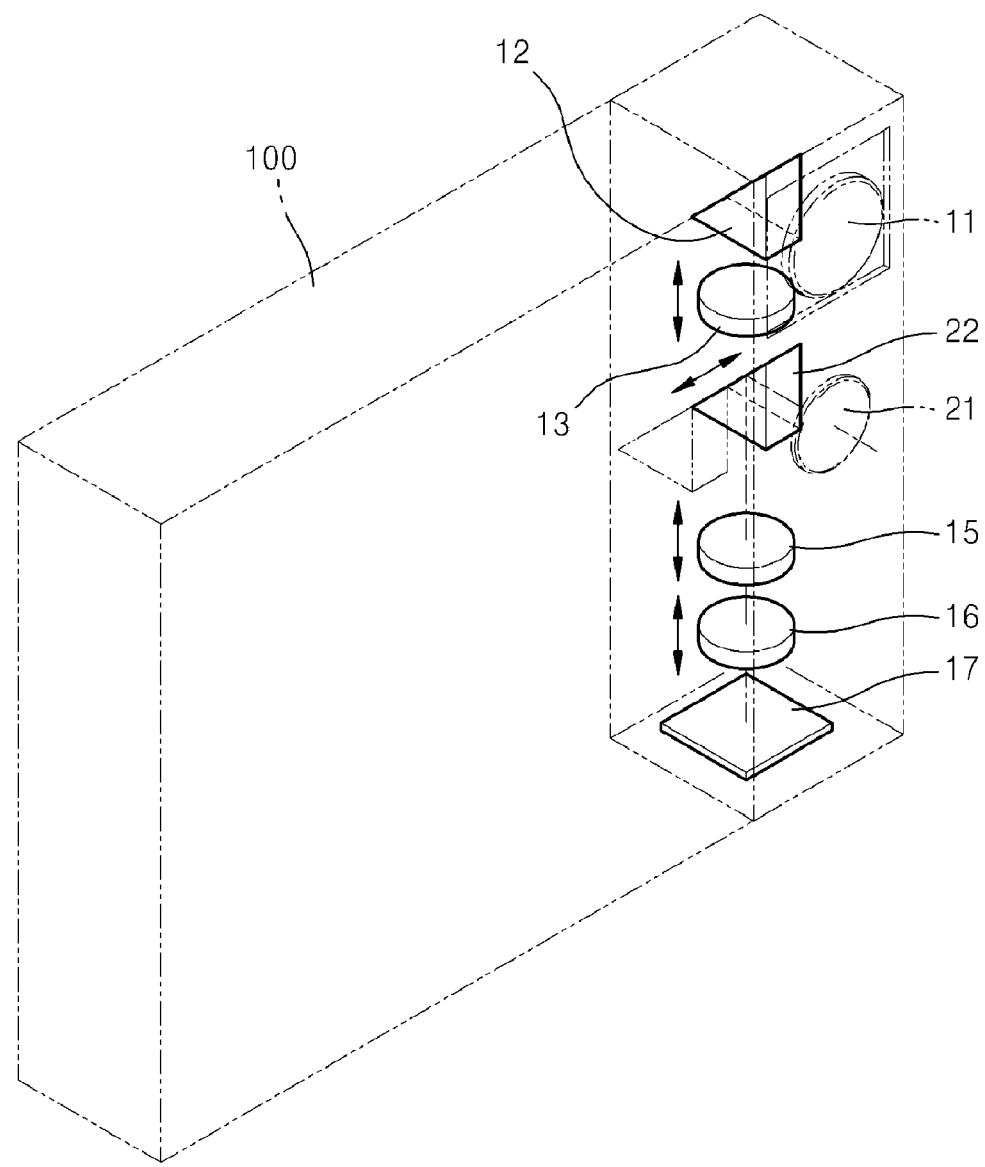
FIG. 5 schematically illustrates a dual lens camera according to an embodiment of the present invention.

When a user tries to use the second optical system 20, the lens cover 23 is opened to allow light to pass through the second incident lens 21 and the second prism 22 which is positioned on an axis between the first zoom lens group 13 and the second zoom lens group 15. The driving direction of the second prism 22 can be a Y-axis direction as shown in FIG. 2D or an X-axis direction as shown in FIG. 5. The driving of a prism can be performed by a motorized mechanism such as a piezoelectric motor or a voice coil motor. The present invention is not limited thereto and many other motorized mechanisms capable of performing a linear motion can be used therefor.

When the second prism 22 is arranged along the optical axis which is between the first and second zoom lenses 13 and 15, the second prism 22 redirects the light passing through the second incident lens 21 by 90° to proceed toward the image sensor 17 and simultaneously block the light passing through the first incident lens 11.

In the present invention, as an embodiment of a single-focus optical system, a wide angle single-focus optical system having a focal length shorter than that of the zoom optical system in the W mode is illustrated. The focal length of the single-focus optical system can be 24 mm. Thus, since the viewing angle is wider, a larger number of objects can be photographed in the same photo. That is, the dual lens optical system according to the present embodiment integrally adopts the first optical system 10 (the zoom optical system) and the second optical system 20 (the single-focus optical system). Thus, an optical zoom ratio in a range wider than that when only the zoom optical system is used.

In particular, the first and second optical systems 10 and 20 may share at least some elements on the same optical path disposed after the second prism 22 that is a movable reflection member. For example, the first and second optical systems 10 and 20 share the second zoom lens group 15, the focusing lens group 16, and the image sensor 17. Thus, the number of elements is reduced compared to conventional methods and therefore there is more efficient use of design space. That is, compared to conventional methods, the present invention provides a high optical zoom ratio in a smaller and thinner digital camera. Also, the cost for materials can be reduced.

FIGS. 3A through 3D illustrate a dual lens optical system according to another embodiment of the present invention. FIGS. 4A through 4D illustrate a dual lens optical system according to yet another embodiment of the present invention. The difference in the embodiments of FIGS. 3 and 4 from FIGS. 2A through 2D is that the movable reflection member is a reflection mirror 122 not the second prism 22. In addition, in FIGS. 4A through 4D, the reflection mirror 222 is in a different position, obviating the need for a separate lens cover 23.

The dual lens optical systems shown in FIGS. 3A through 3D and FIGS. 4A through 4D adopt reflection mirrors 122 and 222, respectively, instead of the second prism 22 illustrated in FIGS. 2A through 2D. When the dual lens optical systems shown in FIGS. 3A through 3C and FIGS. 4A through 4C are used as zoom optical systems, the reflection mirrors 122 and 222 are not located on the optical axis between the first and second zoom lens groups 13 and 15.

In FIGS. 3A through 3D, the lens cover 23 blocks the second incident lens 21 to prevent the light indicating the image of the object from being incident on the second incident lens 21. Thus, the light representing the image of the object passes through the first incident lens 11 and is redirected by the first prism 12 by 90° and passes through the first zoom lens group 13, the second zoom lens group 15, and the focusing lens group 16 for the image to be formed on the image sensor 17.

When the second optical system 20 (the single-focus optical system) is used, the lens cover 23 opens the second incident lens 21 and the reflection mirror 122 pivots to be located on an axis between the first and second zoom lens groups 13 and 15. It is important that the reflection mirrors 122 is accurately positioned at 450 with respect to the axis between the first and second zoom lens groups 13 and 15 to allow the incident light to accurately proceed toward the image sensor 17.

In the dual lens optical systems shown in FIGS. 4A through 4D, the reflection mirror 222 is arranged close to the second incident lens 21 and the lens cover 23 is not provided, unlike the dual lens optical system shown in FIGS. 3A through 3D. When the first optical system 10 (the zoom optical system) is used, the reflection mirror 222 is arranged parallel to the optical axis between the first zoom lens group 13 and the second zoom lens group 15. Accordingly, since the reflection mirror 222 blocks the light representing the image of the object passing through the second incident lens 21, the lens cover 23 is not needed.

When the second optical system 20 (the single-focus optical system) is used, the reflection mirror 222 pivots by 45° to be located on an axis between the first zoom lens group 13 and the second zoom lens group 15. Thus, the light representing the image of the object incident on the first incident lens 11 is blocked by the reflection mirror 222. Only the light representing the image of the object incident on the second incident lens 21 is redirected by 90° by the reflection mirror 222 and proceeds toward the image sensor 17. It is important that the reflection mirror 222 is accurately positioned at 450 with respect to the axis between the first zoom lens group 13 and the second zoom lens group 15 to allow the incident light to accurately proceed toward the image sensor 17.

FIG. 5 schematically illustrates a dual lens camera according to an embodiment of the present invention. The dual lens camera 100 includes the dual lens optical systems (10 and 20), a control unit (not shown), and a memory unit (not shown). Also, the dual lens camera 100 further includes a view finder (not shown).

The image sensor 17 of the optical system receives light representing the image of the object and converts the light to an electric signal for each pixel thereof. An electric signal output from the image sensor 17 is input to the control portion through a signal transfer unit, for example, a flexible printed circuit board (FPCB). The control portion operates and processes the signal to generate image data and may transfer the image data to the memory portion and/or the view finder as necessary.

As described above, in the dual lens camera having the dual lens optical systems 10 and 20 according to the present invention, since the optical systems 10 and 20 share at least some elements, the dual lens camera can be made smaller and thinner. Also, the cost for materials can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging device having a dual lens optical system, the device comprising:
    a first optical system and a second optical system selectively redirecting at least one of two lights of representing images of object from two incident lenses into a first optical axis of light toward an image sensor by at least one reflection member;
    wherein, at least one lens is disposed between an image sensor and the at least one reflection member and is disposed in the first optical axis, and
    wherein when the at least one reflection member is located on the first optical axis, the at least one reflection member reflects light from the second optical system to the image sensor, and when the reflection member is moved out of the first optical axis, light from the first optical system is directed to the image sensor.

2. The imaging device of claim 1, wherein:
    the first optical system comprises:
        a first incident lens on which the light is incident in a direction perpendicular to the first optical axis of light;
        a first reflection member redirecting an optical axis of the light incident from the first incident lens by 90°; and
        a first zoom lens group and a second zoom lens group adjusting a focal length to change a zoom ratio while moving along the first optical axis to allow the light incident from the first incident lens to be formed on the image sensor; and the second optical system comprises:
  a second incident lens on which the light is incident in a direction perpendicular to the first optical axis;
  a movable reflection member selectively positioned in the first optical axis of light between the first zoom lens group and the second zoom lens group to allow the light incident from the second incident lens to be formed on the image sensor; and
  the second zoom lens group disposed between the movable member and the image sensor.

3. The imaging device of claim 2, wherein at least one lens of the second zoom lens group is a focusing lens adjusting focus so that the light is well formed on the image sensor.

4. The imaging device of claim 2, wherein the first optical system and the second optical system share a focusing lens group arranged to move along the first optical axis between the second zoom lens group and the image sensor so as to adjust a focus of an image on the image sensor.

5. The imaging device of claim 2, wherein the first reflection member is a first prism, the second reflection member is a second prism having a reflection surface, and the second prism is movable in a direction perpendicular the first optical axis.

6. The imaging device of claim 5, further comprising a light blocking member for selectively blocking the light incident on the second incident lens in a case where the second prism is not positioned to redirect light from the second optical system.

7. The imaging device of claim 2, wherein the first reflection member is a prism, and the second reflection member is a reflection mirror pivotable to selectively redirect light from the second optical system to the first optical axis.

8. The imaging device of claim 7, wherein when the reflection mirror is pivoted in a first angular position, the light from the second optical system is redirected by 90° toward the image sensor, whereas when the reflection mirror is pivoted in a second angular position, the light from the second optical system is blocked by the reflection mirror.

9. The imaging device of claim 1, wherein the two incident lenses are facing the same direction.

10. The imaging device of claim 1, wherein said at least one lens is associated with at least one of a zoom function and a focus function.

11. An imaging device having a dual lens optical system, the device comprising:
  a first optical system and a second optical system adapted to respectively redirect each of lights of representing the image of objects from two incident lenses into a first optical axis of light toward an image sensor, one of the first optical system and the second optical system including a zoom optical system having a first zoom lens group and a second zoom lens group;
  a first reflection member for redirecting light from a first incident lens; and
  a second reflection member for redirecting light from a second incident lens, the second reflection member being selectively positioned in the first optical axis between the first zoom lens group and the second zoom lens group.

12. The imaging device of claim 11, wherein:
  the first optical system comprises:
    the first incident lens on which the light is incident in a direction perpendicular to the first optical axis of light;
    the first reflection member redirecting an optical axis of the light incident from the first incident lens by 90°;
    the first zoom lens group and the second zoom lens group that adjust a focal length to change a zoom ratio while moving along the first optical axis to allow the light incident from the first incident lens to be formed on the image sensor;
    the image sensor, and
  the second optical system comprises:
    the second incident lens on which the light is incident in a direction perpendicular to the first optical axis;
    a movable reflection member selectively positioned in the first optical axis of light between the first zoom lens group and the second zoom lens group to allow the light incident from the second incident lens to be formed on the image sensor; and
    the second zoom lens group disposed between the movable reflection member and the image sensor.

13. The imaging device of claim 11, wherein at least one lens of the second zoom lens group is a focusing lens that adjusts a focus so that the light is well formed on the image sensor.

14. The imaging device of claim 12, wherein the first optical system and the second optical system share a focusing lens group arranged to move along the first optical axis between the second zoom lens group and the image sensor so as to adjust a focus of an image on the image sensor.

15. The imaging device of claim 12, wherein the first reflection member is a first prism, the second reflection member is a second prism having a reflection surface, and the second prism is movable in a direction perpendicular to the first optical axis.

16. The imaging device of claim 15, further comprising a light blocking member for selectively blocking the light incident on the second incident lens in a case where the second prism is not positioned to redirect light from the second optical system.

17. The imaging device of claim 12, wherein the first reflection member is a prism, and the second reflection member is a reflection mirror pivotable to selectively redirect light from the second optical system to the first optical axis.

18. The imaging device of claim 17, wherein when the reflection mirror is pivoted in a first angular position, the light from the second optical system is redirected by 90° toward the image sensor, whereas when the reflection mirror is pivoted in a second angular position, the light from the second optical system is blocked by the reflection mirror.

19. The imaging device of claim 11, wherein the two incident lenses are facing a same direction.

20. The imaging device of claim 11, wherein said at least one optical element is associated with at least one of a zoom function and a focus function.

21. An imaging device comprising at least one movable reflection member for selectively redirecting at least one of two lights representing images of object from a first optical system or a second optical system into a first optical axis of light toward an image sensor;
  wherein: at least one lens is disposed between the image sensor and the movable reflection member, and
  when the at least one movable reflection member is located on the first optical axis, the at least one movable reflection member reflects light from the second optical system to the image sensor, and when the at least one movable reflection member is moved out of the first optical axis, light from the first optical system is directed to the image sensor.

22. The imaging device of claim 21, wherein:
the first optical system comprises:
a first incident lens on which the light is incident in a direction perpendicular to a first optical axis of light;
a first reflection member redirecting an optical axis of the light incident from the first incident lens by 90°; and
a first zoom lens group and a second zoom lens group adjusting a focal length to change a zoom ratio while moving along the first optical axis to allow the light incident from the first incident lens to be formed on the image sensor; and
the second optical system comprises:
a second incident lens on which the light is incident in a direction perpendicular to the first optical axis;
a movable reflection member selectively positioned in the first optical axis of light between the first zoom lens group and the second zoom lens group to allow the light incident from the second incident lens to be formed on the image sensor; and
the second zoom lens group being disposed between the movable member and the image sensor.

23. The imaging device of claim 22, wherein at least one lens of the second zoom lens group is a focusing lens adjusting a focus so that the light is well formed on the image sensor.

24. The imaging device of claim 22, wherein the first optical system and the second optical system share a focusing lens group arranged to move along the first optical axis between the second zoom lens group and the image sensor so as to adjust a focus of an image on the image sensor.

25. The imaging device of claim 22, wherein the first reflection member is a first prism, the second reflection member is a second prism having a reflection surface, and the second prism is movable in a direction perpendicular the first optical axis.

26. The imaging device of claim 25, further comprising a light blocking member for selectively blocking the light incident on the second incident lens in a case where the second prism is not positioned to redirect light from the second optical system.

27. The imaging device of claim 22, wherein the first reflection member is a prism, and the second reflection member is a reflection mirror pivotable to selectively redirect light from the second optical system to the first optical axis.

28. The imaging device of claim 27, wherein when the reflection mirror is pivoted in a first angular position, the light from the second optical system is redirected by 90° toward the image sensor, whereas when the reflection mirror is pivoted in a second angular position, the light from the second optical system is blocked by the reflection mirror.

29. The imaging device of claim 21, wherein the two incident lenses are facing the same direction.

30. The imaging device of claim 21, wherein said at least one lens is associated with at least one of a zoom function and a focus function.

31. An imaging device comprising:
an image sensor;
a first optical system having a non-movable reflection member for redirecting light representing object image towards the image sensor; and
a second optical system having a movable reflection member for selectively redirecting light representing an object image from the second optical system towards the image sensor;
wherein the movable reflection member is disposed between the non-movable reflection member and the image sensor,
wherein at least one lens is disposed between the image sensor and the movable reflection member.

32. The imaging device of claim 31, wherein:
the first optical system comprises:
a first incident lens on which the light is incident in a direction perpendicular to a first optical axis of light;
the non-movable reflection member redirecting an optical axis of the light incident from the first incident lens by 90°; and
a first zoom lens group and a second zoom lens group adjusting a focal length to change a zoom ratio while moving along the first optical axis to allow the light incident from the first incident lens to be formed on the image sensor; and
the second optical system comprises:
a second incident lens on which the light is incident in a direction perpendicular to the first optical axis;
the movable reflection member selectively positioned in the first optical axis of light between the first zoom lens group and the second zoom lens group to allow the light incident from the second incident lens to be formed on the image sensor; and
the second zoom lens group disposed between the movable member and the image sensor.

33. The imaging device of claim 32, wherein at least one lens of the second zoom lens group is a focusing lens that adjusts a focus so that the light is well formed on the image sensor.

34. The imaging device of claim 32, wherein the first optical system and the second optical system share a focusing lens group arranged to move along the first optical axis between the second zoom lens group and the image sensor so as to adjust a focus of an image on the image sensor.

35. The imaging device of claim 32, wherein the non-movable reflection member is a first prism, the movable reflection member is a second prism having a reflection surface, and the second prism is movable in a direction perpendicular the first optical axis.

36. The imaging device of claim 35, further comprising a light blocking member for selectively blocking the light incident on the second incident lens in a case where the second prism is not positioned to redirect light from the second optical system.

37. The imaging device of claim 32, wherein the non-movable reflection member is a prism, and the movable reflection member is a reflection mirror pivotable to selectively redirect light from the second optical system to the first optical axis.

38. The imaging device of claim 37, wherein when the reflection mirror is pivoted in a first angular position, the light from the second optical system is redirected by 90° toward the image sensor, whereas when the reflection mirror is pivoted in a second angular position, the light from the second optical system is blocked by the reflection mirror.

39. The imaging device of claim 31, wherein the two incident lenses are facing the same direction.

40. The imaging device of claim 31, wherein said at least one lens is associated with at least one of a zoom function, and a focus function.

41. An imaging device having a dual lens optical system, the device comprising:
a first optical system and a second optical system for selectively redirecting at least one of two lights of representing images of object from two incident lenses into a first optical axis of light toward an image sensor by at least one reflection member;

wherein:
at least one optical element is disposed between an image sensor and the at least one reflection member;
the first optical system is configured to operate both a zoom function and a focus function; and
the second optical system is configured to operate solely a focus function.

42. An imaging device having a dual lens optical system operable as either a zoom device or a fixed device, the device comprising:
a first incident lens that is closest to an object in a first light path;
a second incident lens that is closest to the object in a second light path, wherein the first and second light path share a portion of the light path in common and each have a unique portion of the light path;
a focus-zoom lens group between the first incident lens and an image sensor that is within the first light path and that comprises lenses that are movable to perform both a focusing function and zooming function when operating the imaging device as a zoom device;
wherein the focus-zoom lens group comprises a zoom-portion of the lens group that is positioned to be removed from the second light path when operating the imaging device as a fixed lens system.

* * * * *